United States Patent
Chen

(10) Patent No.: US 10,482,546 B2
(45) Date of Patent: Nov. 19, 2019

(54) SYSTEMS AND METHODS FOR FINDING NEARBY USERS WITH COMMON INTERESTS

(71) Applicant: Disney Enterprises, Inc., Burbank, CA (US)

(72) Inventor: Alexander C. Chen, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 380 days.

(21) Appl. No.: 14/737,351

(22) Filed: Jun. 11, 2015

(65) Prior Publication Data

US 2016/0364811 A1    Dec. 15, 2016

(51) Int. Cl.
| | | |
|---|---|---|
| *H04L 29/08* | (2006.01) | |
| *H04W 4/02* | (2018.01) | |
| *G06Q 10/10* | (2012.01) | |
| *G06Q 50/00* | (2012.01) | |
| *H04W 4/029* | (2018.01) | |
| *H04W 88/02* | (2009.01) | |
| *H04W 8/00* | (2009.01) | |

(52) U.S. Cl.
CPC ............. *G06Q 50/01* (2013.01); *G06Q 10/10* (2013.01); *H04L 67/16* (2013.01); *H04W 4/029* (2018.02); *H04W 8/005* (2013.01); *H04W 88/02* (2013.01)

(58) Field of Classification Search
CPC .......... H04L 67/16; H04W 4/02; G06Q 10/10
See application file for complete search history.

(56) References Cited

U.S. PATENT DOCUMENTS

| | | | |
|---|---|---|---|
| 8,000,726 B2 | 8/2011 | Altman et al. | |
| 8,014,763 B2* | 9/2011 | Hymes | H04M 1/26 455/414.2 |
| 8,024,431 B2 | 9/2011 | Hoffman | |
| 8,150,416 B2* | 4/2012 | Ribaudo | G01S 5/0018 370/338 |
| 8,559,980 B2* | 10/2013 | Pujol | H04W 4/023 455/456.3 |

(Continued)

OTHER PUBLICATIONS

Xie et al., Privacy-Preserving Matchmaking for Mobile Social Networking Secure Against Malicious Users, 2011 Ninth Annual International Conference on Privacy, Security and Trust, Jul. 19-21, 2011, pp. 252-259.

(Continued)

*Primary Examiner* — Asghar H Bilgrami
(74) *Attorney, Agent, or Firm* — Sheppard Mullin Richter & Hampton LLP

(57) ABSTRACT

The present disclosure provides systems and methods for a mobile device to select interest information to automatically share with other nearby users, who are also sharing interest information, and detect any nearby users with common interests. In one embodiment, a method at a mobile device comprises receiving on the first mobile device a first set of movie interests associated with a first user; providing a notification on the first mobile device that a second mobile device associated with a second user has an interest in common with the first set of movie interests, and the second mobile device is within a specified proximity to the first mobile device; and initiating a request to communicate with the second mobile device without revealing an identity of the first user.

13 Claims, 4 Drawing Sheets

(56) References Cited

U.S. PATENT DOCUMENTS

| | | | | |
|---|---|---|---|---|
| 8,898,250 B2* | 11/2014 | Callahan | ............... | G06Q 30/02 709/217 |
| 9,113,295 B2* | 8/2015 | Johnson | ............... | H04W 4/02 |
| 2005/0181803 A1 | 8/2005 | Weaver et al. | | |
| 2007/0112762 A1 | 5/2007 | Brubaker | | |
| 2008/0108308 A1* | 5/2008 | Ullah | ............... | G06Q 30/02 455/41.2 |
| 2008/0301149 A1* | 12/2008 | Malcolm | ............... | G06F 16/437 |
| 2010/0024042 A1* | 1/2010 | Motahari | ............... | G06F 21/577 726/26 |
| 2010/0332326 A1* | 12/2010 | Ishai | ............... | G06Q 10/10 705/14.58 |
| 2012/0271883 A1* | 10/2012 | Montoya | ............... | H04W 4/023 709/204 |
| 2012/0317198 A1* | 12/2012 | Patton | ............... | G06Q 10/10 709/204 |
| 2013/0097246 A1 | 4/2013 | Zifroni et al. | | |
| 2013/0185368 A1 | 7/2013 | Nordstrom et al. | | |
| 2014/0101243 A1* | 4/2014 | Naveh | ............... | G06Q 50/01 709/204 |
| 2014/0364151 A1* | 12/2014 | Schiff | ............... | H04L 63/0838 455/456.3 |
| 2015/0066789 A1 | 3/2015 | Keith | | |
| 2016/0005003 A1* | 1/2016 | Norris | ............... | G06Q 10/10 705/7.19 |
| 2017/0134919 A1* | 5/2017 | Nordstrom | ............... | H04W 4/21 |

OTHER PUBLICATIONS

Yang et al., E-SmallTalker: A Distributed Mobile System for Social Networking in Physical Proximity, 2010 IEEE 30th International Conference on Distributed Computing Systems (ICDCS), Jun. 21-25, 2010, pp. 468-477.

Beach et al., Fusing Mobile, Sensor, and Social Data to Fully Enable Context-Aware Computing, HotMobile 2010, Proceedings of the Eleventh Workshop on Mobile Computing Systems & Applications, Feb. 22, 2010, pp. 60-65.

* cited by examiner

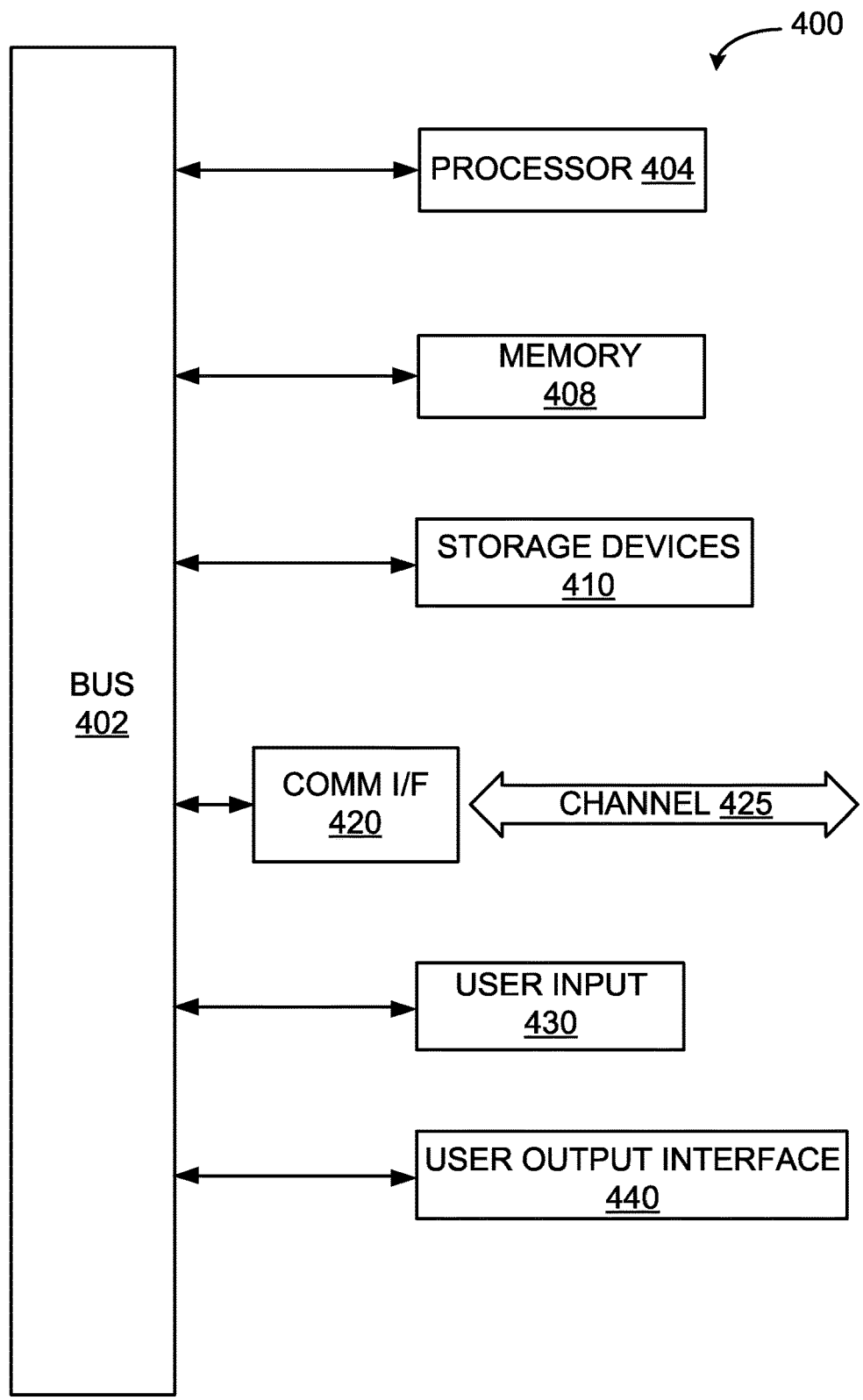

SYSTEMS AND METHODS FOR FINDING NEARBY USERS WITH COMMON INTERESTS

TECHNICAL FIELD

The present disclosure relates generally to social media, and more particularly to systems and methods for finding nearby users with common interests.

SUMMARY OF THE INVENTION

The present disclosure may be embodied in a method at a first mobile device, the method comprising: receiving on the first mobile device a first set of movie interests associated with a first user; providing a notification on the first mobile device that a second mobile device associated with a second user has an interest in common with the first set of movie interests, and the second mobile device is within a specified proximity to the first mobile device; and initiating a request to communicate with the second mobile device without revealing an identity of the first user.

In one aspect of this embodiment, at least one of a sound, a haptic response, and a display of the notification may depend on a number of interests in common between the first and second sets of movie interests.

In another aspect of this embodiment, the method may further comprise receiving a user command to stop sharing the first user's movie interests with other devices. However, the first mobile device may still provide a notification on the first mobile device that a second mobile device associated with a second user has an interest in common with the first set of movie interests, and that the second mobile device is within a specified proximity to the first mobile device.

In another aspect of this embodiment, the method may further comprise providing a graphical user interface to allow a user to select at least one of an icon, avatar, image, and video to send to the second mobile device if the second mobile device associated with a second user has an interest in common with the first set of movie interests, and the second mobile device is within a specified proximity to the first mobile device.

In another aspect of this embodiment, the method may further comprise receiving a user preference defining the specified proximity around the first mobile device to find other devices with common movie interests.

In another aspect of this embodiment, the method may further comprise receiving a user preference to provide notifications within at least one of a specified time range and a specified location.

In another aspect of this embodiment, the request to communicate with the second mobile device may comprise at least one of initiating a chat session with the second mobile device and initiating a game with the second mobile device.

In another aspect of this embodiment, the method may further comprise receiving a user preference to select a group of users such that the first mobile device only provides a notification if a second user is in the selected group.

The present disclosure may also be embodied in a mobile device comprising a transmitter to transmit a first set of movie interests associated with a first user; and an interface to notify the first user if a second mobile device associated with a second user has an interest in common with the first set of movie interests, and if the second mobile device is within a specified proximity to the first mobile device. The interface may be configured to initiate a request to communicate with the second mobile device without revealing an identity of the first user.

In certain aspects of this embodiment, at least one of a sound, a haptic response, and a display of the notification may depend on a number of interests in common between the first and second sets of movie interests.

In another aspect of this embodiment, the user interface may be configured to receive a user preference defining the specified proximity around the mobile device to find other devices with common movie interests.

In yet a further aspect of this embodiment, the user interface may be further configured to receive a user preference to provide notifications within at least one of a specified time range and a specified location.

The device may be further configured such that the request to communicate with the second mobile device comprises at least one of initiating a chat session with the second mobile device and initiating a game with the second mobile device.

The user interface may be configured to receive a user preference to select a group of users such that the first mobile device only provides a notification if a second user is in the selected group.

In yet another aspect of this embodiment, the interface may be configured to allow a user to select at least one of an icon, avatar, image, and video to send to the second mobile device if the second mobile device associated with a second user has an interest in common with the first set of movie interests, and the second mobile device is within a specified proximity to the first mobile device.

The present disclosure may also be embodied in a system comprising: a transceiver to receive a first set of movie interests of a first user from a first mobile device and a second set of movie interests of a second user from a second mobile device; a database to store the received first and second sets; and a processor to determine whether the first mobile device associated with the first set of movie interests of the first user is within a specified proximity of the second mobile device associated with the second set of movie interests of the second user where the first and second sets share at least one movie interest, wherein the transceiver is configured to notify at least one of the first and second mobile devices that the first and second mobile devices are within the specified proximity, and the first and second sets share at least one movie interest.

In one aspect of this embodiment, the system may further comprise a module to track locations of the first and second mobile devices. In certain aspects, the location of the first mobile device may only be provided if a sharing option is activated on the first mobile device.

In another aspect of this embodiment, the first set of movie interests may comprise at least one of movie interests input by the first user and movie interests derived from the first user's history of viewed movies.

In yet another aspect of this embodiment, the transceiver may be configured to notify at least one of the first and second mobile devices that the first and second mobile devices are within the proximity and the first and second sets share at least one movie interest without revealing an identity of the first user or the second user.

The present disclosure may also be embodied in non-transitory computer readable medium comprising an instruction set configured to command a computing device to carry out the methods described herein.

These and other features and advantages of the invention should become more readily apparent from the detailed description of the preferred embodiments set forth below taken in conjunction with the accompanying drawings, which illustrate, by way of example, the principles of the disclosure.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

FIG. 4 illustrates a sample computing module that may be used to implement certain features and embodiments of the present disclosure.

DETAILED DESCRIPTION

The present disclosure provides systems and methods for a mobile device to receive a user's interest information, automatically find other nearby users with common interests, and allow the user to interact with them. One advantage of the disclosed systems and methods is a user can interact (e.g., chat or play games) with other nearby users with common interests anonymously to maintain a desired level of privacy. The user can use the mobile device to select content (e.g., images, videos) and/or information to share with other nearby users with common interests.

Figure 1:
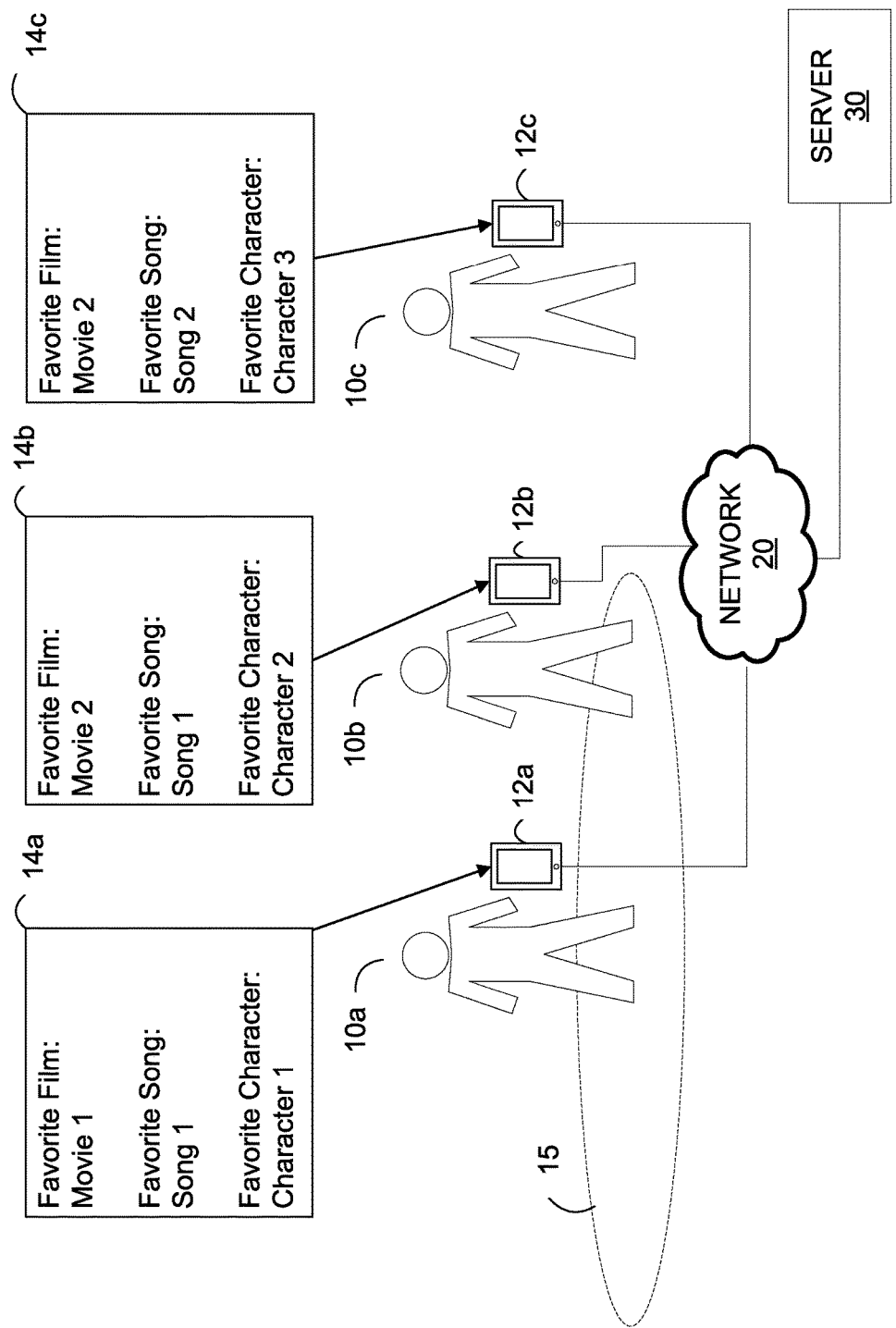
FIG. 1 provides a perspective view of an interest sharing system, in accordance with an embodiment of the present disclosure.

As shown in FIG. 1, multiple users 10a-c may each have one or more mobile devices 12a-c (e.g., smartphone, tablet, laptop, watch, wristband, glasses, etc.). In FIG. 1, a first user 10a is holding a first mobile device 12a. The first user 10a can input a set of user interest information 14a into the first mobile device 12a that the first user 10a wishes to share with other users. The information 14a may be stored on the device 12a and/or at a server 30 in communication with a network 20. It can be seen that the user has selected a favorite film (movie 1), a favorite song (song 1), and a favorite character (character 1).

It should be understood that user interest information does not necessarily have to be limited to singular "favorites" and may include anything that the user has an interest in or enjoys, and may comprise as much or as little information as desired. Examples of interests may include favorite films, types of movies (sci-fi, suspense, drama, action, comedy, family), shows, songs, characters, actors/actresses, artists, musicians, vacation spots, restaurants, foods, amusement park rides, hobbies, games, etc. User interest information may also include certain things that the user dislikes, such that users with common dislikes can be connected and interact with one another. For the sake of explanation, the users in FIG. 1 are shown as having shared a favorite film, song, and character.

Returning to FIG. 1, a second user 10b is also sharing interest information 14b, which also includes a favorite film (movie 2), a favorite song (song 1), and a favorite character (character 2). Finally, a third user 10c is also sharing interest information 14c, including the third user 10c's favorite film (movie 2), favorite song (song 2), and favorite character (character 3). From this information, it can be seen that the first user 10a and the second user 10b have the same favorite song (song 1), while the second user 10b and the third user 10c have the same favorite movie (movie 2).

When the mobile devices 12a-c come within a certain range (i.e., distance, proximity) of each other, the mobile devices 12a-c may share interest information with one another, so that they can determine whether nearby users have common interests. The mobile devices 12a-c may share information directly (e.g., via Bluetooth or near-field communications), or over a common network 20 (e.g., cellular data or a WiFi network) and a server 30. As described in greater detail below, these ranges/proximities may be defined by a user and may also vary from mobile device to mobile device. In FIG. 1, for example, user 10a and mobile device 12a have a range 15, and it can be seen that user 10b and mobile device 12b are within the range 15, but user 10c and mobile device 12c are not. Proximity may be determined by the mobile devices themselves (e.g., mobile devices are able to determine how near or far other devices are), or may be determined by a remote server (e.g., server 30) using location information (e.g., using mobile device GPS information). In this respect, the mobile devices 12a-c and/or other components of the disclosed system may contain a module to track the locations of the mobile devices 12a-c.

In addition to or instead of the mobile devices 12a-12c, the server 30 may compare the interest information of the mobile devices and determine whether nearby users have common interests.

Figure 3:
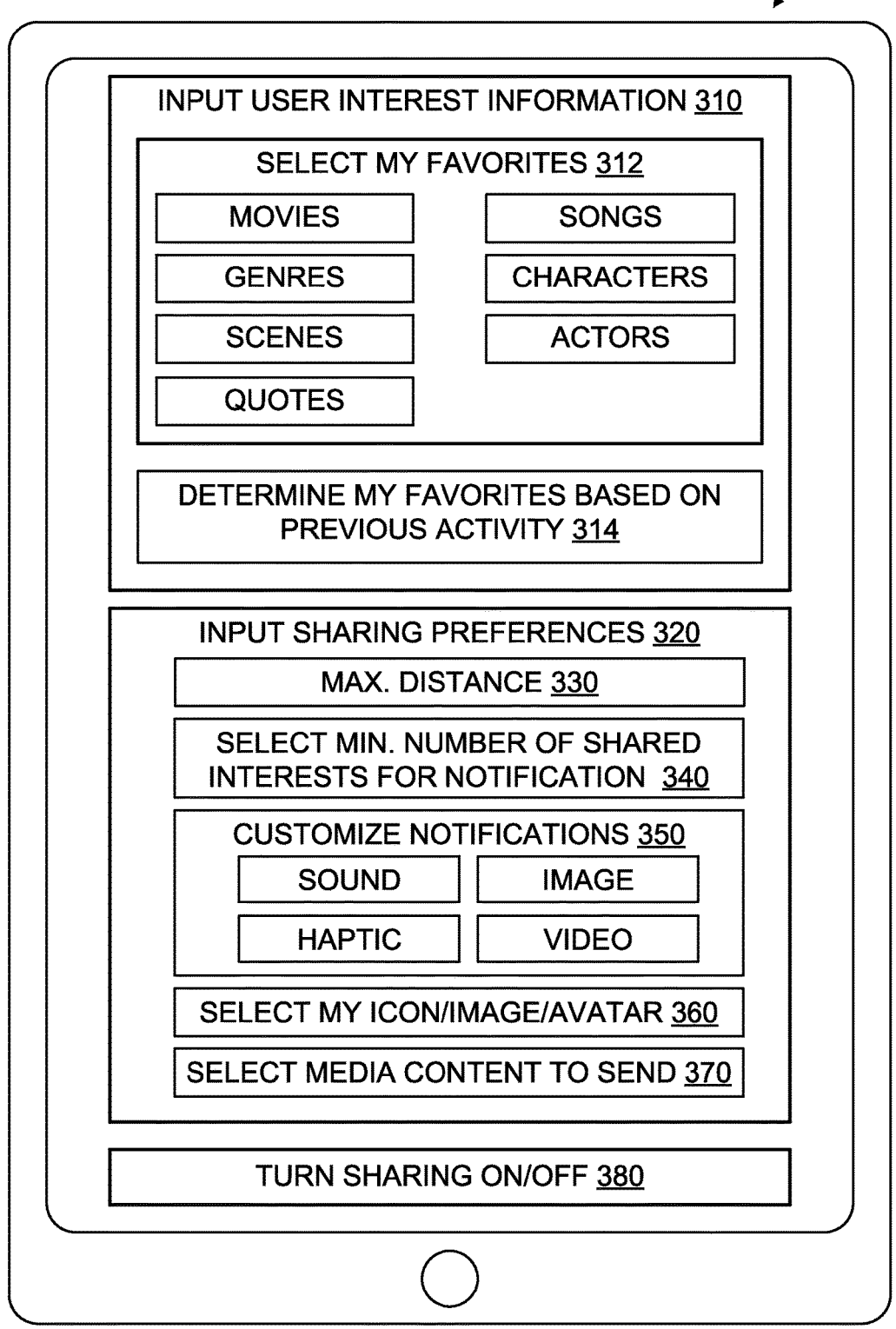
FIG. 3 provides a sample user interface for one or more of the mobile devices described herein.

As shown in FIG. 3, user interest information 310 may be provided manually by a user, and/or collected by a mobile device or server 30 automatically based on a user's behavior. For example, in FIG. 3, users may manually input films, genres, scenes, quotes, songs, characters, actors or actresses that they like (block 312). Alternatively, user "favorites" may be inferred or learned from a user's activities (block 314). For examples, films, TV shows, genres, scenes, quotes, songs, characters, actors or actresses that are frequently viewed or positively reviewed/rated by the user may be added to the user's interest information. A restaurant that a user frequently checks into on social media may be added to a user's interest list. A user's interest information may be determined by both manually inputted information and behavior-based information.

From the perspective of the first user 10a and the first mobile device 12a in FIG. 1, interest information may be received and/or compared from the second and third users' mobile devices 12b and 12c when the mobile devices 12a-c come within a certain range of each other (in FIG. 1, mobile device 12b is currently in the range 15, while mobile device 12c would have to move closer to enter the range 15). After receiving the interest information 14b and 14c, the first mobile device 12a (or the server 30) determines that a common interest is shared with the second user 10b, but not with the third user 10c. The mobile device 12a provides a notification to the first user 10a that a nearby user shares a common interest.

This notification may be implemented in a variety of ways and selected by a user (block 350 in FIG. 3). Based on the number of interests in common between two user devices, there may be different levels or types of notifications. For example, if only one interest is in common between two user devices, a device may emit a small beep or haptic vibration. If two or more interests are in common between two user devices, a device may emit a louder sound, a repeated sound, a stronger haptic vibration, a repeated haptic vibration and/or a visual notification (e.g., a message on the mobile device's display saying "A hero who likes Movie 1 is nearby!"). The audio notification could be, for example, a noise, a chime, a ringtone, or voice recording played by the mobile device. The haptic notification may be a vibration of the mobile device. The notification could be any combination of these. The message may be selected by a user, or selected by a system operator.

The mobile devices 12b and 12c of the second and third users 10b and 10c (or the server 30) may go through similar processes to determine nearby users with common interests. The mobile device 12b belonging to the second user 10b would indicate that there are two nearby users sharing common interests (user 10a has the same favorite song, and user 10c has the same favorite movie). The mobile device 12c belonging to the third user 10c would indicate there is one nearby user sharing one or more common interest (user 10b has the same favorite movie). In certain embodiments, the determination of shared interests may be performed by the mobile devices themselves, or may be performed at the server 30 and then transmitted to the mobile devices.

The amount of information provided in the notifications may vary based on user preferences and settings. For example, users may wish to share interest information and interact with other users sharing common interests, but may wish to remain anonymous. In this case, the notification may notify the user that there are nearby users with common interests, but does not specifically identify the other user. An icon or avatar may be displayed to represent an anonymous user. In an alternative embodiment, a user's full profile may be provided with the user's name, other interests, and other personal information. Users may be able to pre-determine how much personal information is shared with other users, as shown in the customize sharing preferences block 320 in FIG. 3.

In certain embodiments, more information may be shared with other users based on how many interests are shared by the users. So for example, if only one interest is shared (1 interest match found), the other user may see an anonymous icon representing the user, such as USER 2. If three or more interests are shared (matched), the other user may see an avatar selected by the user. If 10 or more interests are shared, the other user may see a drawing or a photo of the user.

Figure 2:
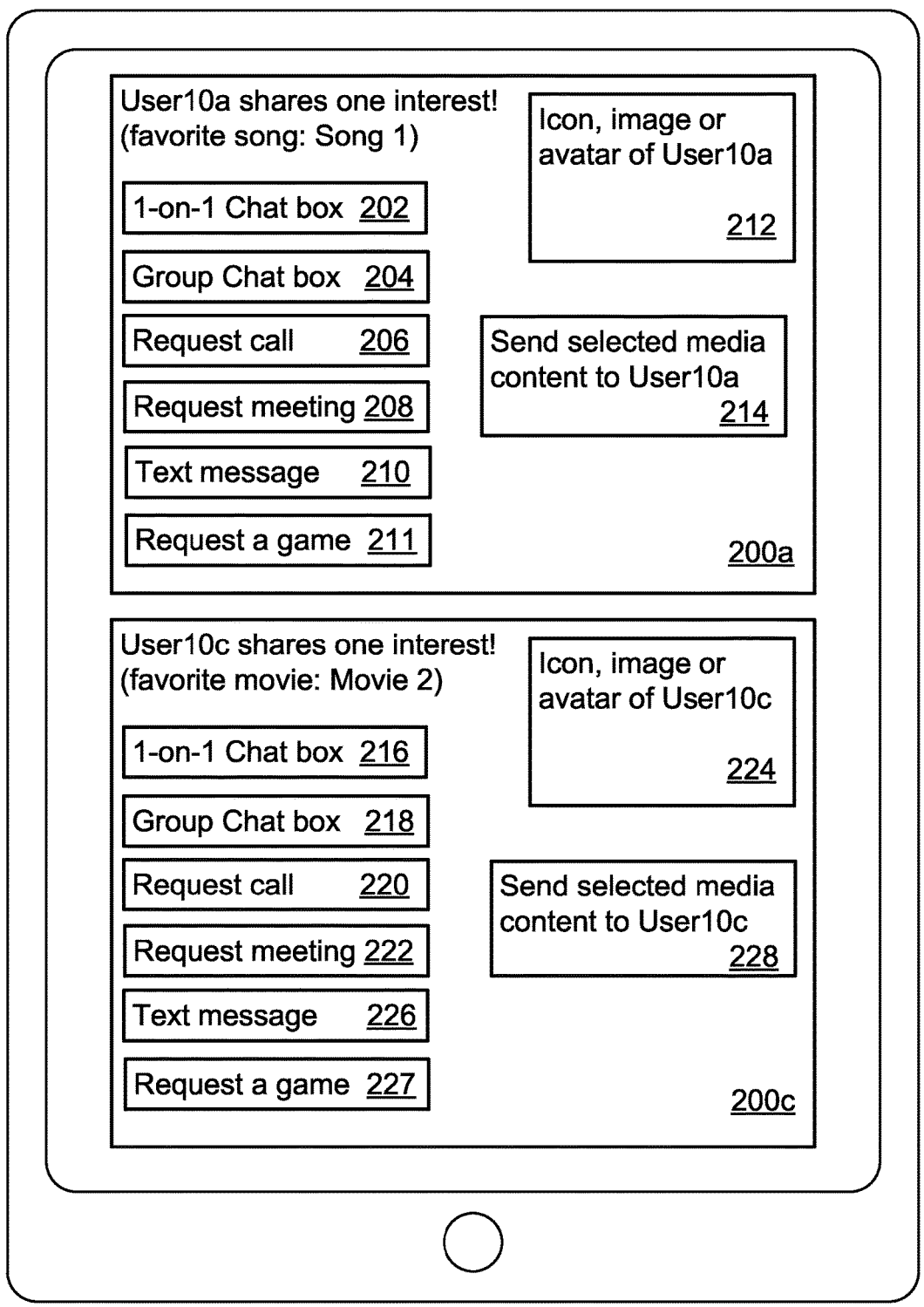
FIG. 2 provides a sample notification screen on a mobile device, in accordance with an embodiment of the present disclosure.

FIG. 2 provides an example mobile device notification screen that may be implemented on user 10b's mobile device 12b. In the embodiment shown in FIG. 2, user names, icons, avatars, images or videos are used to represent each user (e.g., blocks 212 and 224). These user names/icons/avatars may be selected by each user to represent themselves. In FIG. 2, the mobile device 12b provides a notification that a first user shares a common favorite song, and a second user shares a common favorite movie. User 10a has selected the username "User10a." Similarly, user 10c has selected the username "User10c." Similar notifications may appear on mobile devices 12a and 12c to indicate nearby users with shared interests. In alternative embodiments, the notification may be more generic (e.g., does not provide a user identifier and/or does not identify the shared interest), or more specific (e.g., provides additional user information beyond the shared interest).

Once users with common interests are detected, these users may be given the opportunity to interact with one another. As can be seen in FIG. 2, user 10b is given the option to initiate a one-on-one or group chat session (blocks 202, 204, 216, 218), initiate a text message (blocks 210, 226), initiate a phone call (blocks 206, 220), initiate an in-person meeting (blocks 208, 222), or share media content (blocks 214, 228) with nearby users having common interests.

If user 10b chooses to initiate communication with user 10a, then user 10a may receive on mobile device 12a a request indicating that user 10b has requested a chat, a phone call, a meeting, etc. Alternatively, or additionally, rather than providing a notification of user 10b's request to user 10a, mobile device 12a may wait for user 10a to authorize or initiate interaction with user 10b. In this way, user 10a is unaware that user 10b has requested communication unless user 10a also attempts to initiate interaction with user 10b (i.e., both users have made an interaction request). If both users reciprocally choose to initiate interaction, then the mobile devices 12a and 12b may initiate the requested communication.

In certain embodiments, if one user selects a certain form of communication (e.g., a chat) and the other chooses another (e.g., a meeting), then the least-intrusive communication choice would be initiated (e.g., the chat would be initiated rather than the in-person meeting).

FIG. 3 provides a sample user interface 300 for the mobile devices described herein. Using the user interface 300, a user may input interest information (button 310). A user can select button 310 to input new interests, or to remove and/or update their current interest information. A user can also select whether their user interest information will comprise only manually entered interests (block 312), only behavior/activity-inferred interests (such as a user's activity, such as recently watched movies, on a specific device or on multiple devices using a specific user account) (block 314), or both.

A user may also input his or her sharing preferences (button 320). A user's sharing preferences may include numerous attributes that are customizable by a user. For example, users may specify particular times, such as before 9 AM and after 5 PM, and/or locations, such as a convention center, office building, school campus, etc., when sharing should be turned on or off. Users may set their devices to share information when the devices are away from certain locations, such as an office building or school. In certain embodiment, this may be carried out using location tracking information (e.g., GPS information). A user may also be able to specify certain content that is to be shared at a particular time and/or place. A user may also be able to select a group of users and only share interest information with that group, such as all students at a specific school, all members of a team, all attendees at a conference, all employees in a company, etc. Additional examples are shown in FIG. 3.

A user may be able to define a maximum or minimum distance for sharing interest information (button 330). For example, a user can select a 5-foot proximity, such that interest information is only shared with other users within 5 feet of the user, a 10-foot proximity, or a 25-foot proximity. In certain embodiments, mobile devices or a server 30 may be able to detect a users' location and/or the boundaries of a room or building, such that users can choose to share information with anyone in the same room or building as the user.

A first user may set a number X (block 340 in FIG. 3), which configures the device or mobile app to notify the first user if a second user with X number of shared interests (such as 5 or 10 interests) is in a proximity of the first user. Thus, the device or mobile app will not notify the first user if other users with less than X number of shared interests are in proximity of the first user.

A user may also be given the option to customize notifications seen on the user's device and/or notifications sent to other users with the same interests within proximity of the user's device (button 350). For example, users can select and change a particular image, video clip (such as a movie scene, movie trailer, director's comments, deleted scene, movie news, artwork, interviews, behind the scene, character history, movie recommendation, etc.), and/or audio clip (such as a song), or input a custom message that will be transmitted to other users who share a particular interest (block 370). In a more specific example, if a user lists a specific movie as an interest, the user may choose a favorite scene and specify an audio and/or video message from the movie that will be transmitted to other users who share the same movie as an interest. Users can also select an icon/image/avatar to be shown to other users having similar interests (button 360).

Finally, a user may select button 380 to manually turn sharing on or off. If sharing is turned on, then the user device will share the user's interest information and exchange this information with other nearby users to find common interests. If sharing is turned off, the user device will not share the user's interests. Depending on the implementation, a user device may still be able to detect other user devices that have common interests (i.e., they can still receive other users' interest information), but will not share their own user information. In other embodiments, if sharing is turned off, a user device may not be able to receive other users' interest information. This may also be determined based on the preferences of the user and/or the preferences of other users.

In addition to the basic interactions described above (e.g., initiating a chat, phone call, in person meeting), the mobile devices may initiate other interest-based interactions, such as a game (blocks 211 and 227 in FIG. 2). For example, shared interests may allow users to participate in games against each other or larger group activities based on those interests.

Consider the example of a movie theater. Users going to watch a film may choose to be affiliated with one group (e.g., heroes), or may choose to be affiliated with another group (e.g., villains). As users walk into a theater, users may pass by a beacon or a stationary device, which queries the user's mobile device to determine whether they have heroes (or hero-related information) or whether they have villains (or villain-related information) in their interest information. Using the user's interest information, the beacon can cause a user's mobile device to notify others that the user is affiliated with the heroes or villains. In a particular example, a user's mobile device may show the heroes logo or the villains logo.

As discussed above, notifications may have a visual aspect, an audio aspect, and/or a haptic aspect. Further, notifications may also have an "environmental" aspect such that the environment around a user changes based on their interests. For example, as a user enters the movie theater, the hall may glow a particular color based on the user's interest-based affiliation, or a user's seat may glow a particular color once they sit down to indicate the user's affiliation. In these ways, other nearby users can see which "side" a user is on and that can lead to interactions between users based on shared or differing interests.

The example of a movie theater can be expanded into other arenas and lead to additional group-based activities. For example, at an amusement park, users with detected common interests in a particular area may be invited to participate in a trivia game, a video game, or a real-life group-game with teams based on their shared interests. In a more particular example, those users in an area listing a specific movie as an interest may be invited to participate in a game of dodgeball, and teams may be divided based on those that identify themselves as fans of one group in the movie versus those that identify themselves as fans of another group in the movie. Again, by having users identify and share their interests with other users, interaction between people can be encouraged by demonstrating similar interests between them.

It should be understood that while the figures have presented exemplary embodiments of the present systems and methods, revisions may be made to the disclosed systems and methods without departing from the scope of the present disclosure.

Where components or modules of the disclosed systems and methods are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Referring now to FIG. 4, computing module 400 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 400 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, random access memory (RAM) or other dynamic memory might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404. The computing module 400 might also include one or more various storage devices 410, which might include, for example, a magnetic tape drive, an optical disc drive, a solid state drive, removable storage media such as a CD or DVD, or any other non-volatile memory.

Computing module 400 might also include a communications interface 420. Communications interface 420 might be used to allow software and data to be transferred between computing module 400 and external devices. Examples of communications interface 420 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 420 might typically be carried on signals, which can be electronic, electromagnetic (which includes optical) or other signals capable of being exchanged by a given communications interface 420. These signals might be provided to communications interface 420 via a channel 425. This channel 425 might carry signals and might be implemented using a wired or wireless communication medium. Some examples of a channel might include a phone line, a cellular link, an RF link, an optical link, a network interface, a local or wide area network, and other wired or wireless communications channels.

Computing module 400 might also include one or more user inputs 430. The user input allows for the user to enter commands to the computing module 400 and interact with it. Examples of user inputs might include a computer mouse, a keyboard, a touch-sensitive screen, a stylus, a mousepad, a joystick, an accelerometer, a gyroscope, a camera, a remote control, or any other user input mechanism.

The computer module 400 might also include one or more user output interfaces 440. The user output interfaces 440 might be used to interact with the user by presenting information or sensory outputs for the user. Examples of user output interfaces might include visual outputs, such as a display screen or monitor, or audio outputs, such as a speaker or headphone output.

In this document, the terms "computer readable medium" and "computer usable medium" are used to generally refer to media such as, for example, memory 408, storage unit 410, and channel 425. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:

1. A method at a first mobile device, the method comprising:
   receiving on the first mobile device a first set of movie interests associated with a first user;
   providing a notification on the first mobile device that a second mobile device associated with a second user has an interest in common with the first set of movie interests, and the second mobile device is within a specified proximity to the first mobile device;
   initiating a request to communicate with the second mobile device without revealing an identity of the first user;
   receiving a user preference defining the specified proximity around the first mobile device to find other devices with common movie interests; and receiving a user preference to provide notifications within a specified time range;

wherein at least one of a sound and a haptic response of the notification depends on a number of movie interests in common between the first and second sets of movie interests.

2. The method of claim 1, further comprising receiving a user command to stop sharing the first user's movie interests with other devices, but the first mobile device still provides a notification on the first mobile device that a second mobile device associated with a second user has an interest in common with the first set of movie interests, and the second mobile device is within a specified proximity to the first mobile device.

3. The method of claim 1, further comprising providing a graphical user interface to allow a user to select at least one of an icon, avatar, image, and video to send to the second mobile device if the second mobile device associated with a second user has an interest in common with the first set of movie interests, and the second mobile device is within a specified proximity to the first mobile device.

4. The method of claim 1, wherein the request to communicate with the second mobile device comprises at least one of initiating a chat session with the second mobile device and initiating a game with the second mobile device.

5. The method of claim 1, further comprising receiving a user preference to select a group of users such that the first mobile device only provides a notification if a second user is in the selected group.

6. A mobile device comprising:
a transmitter to transmit a first set of movie interests associated with a first user; and
an interface to notify the first user if a second mobile device associated with a second user has an interest in common with the first set of movie interests, and the second mobile device is within a specified proximity to the first mobile device, wherein the interface is configured to initiate a request to communicate with the second mobile device without revealing an identity of the first user;
wherein at least one of a sound and a haptic response of the notification depends on a number of movie interests in common between the first and second sets of movie interests;
wherein the interface is configured to receive a user preference defining the specified proximity around the mobile device to find other devices with common movie interests;
wherein the interface is configured to receive a user preference to provide notifications within a specified time range.

7. The mobile device of claim 6, wherein the request to communicate with the second mobile device comprises at least one of initiating a chat session with the second mobile device and initiating a game with the second mobile device.

8. The mobile device of claim 6, wherein the interface is configured to receive a user preference to select a group of users such that the first mobile device only provides a notification if a second user is in the selected group.

9. The mobile device of claim 6, wherein the interface is configured to allow a user to select at least one of an icon, avatar, image, and video to send to the second mobile device if the second mobile device associated with a second user has an interest in common with the first set of movie interests, and the second mobile device is within a specified proximity to the first mobile device.

10. A system comprising:
a transceiver to receive a first set of movie interests of a first user from a first mobile device and a second set of movie interests of a second user from a second mobile device;
a database to store the received first and second sets; and
a processor to determine whether the first mobile device associated with the first set of movie interests of the first user is within a specified proximity of the second mobile device associated with the second set of movie interests of the second user where the first and second sets share at least one movie interest, wherein the transceiver is configured to notify at least one of the first and second mobile devices that the first and second mobile devices are within the specified proximity, and the first and second sets share at least one movie interest, and wherein the transceiver is configured to provide notifications within a specified time range;
wherein at least one of a sound and a haptic response of the notification depends on a number of movie interests in common between the first and second sets of movie interests;
wherein the transceiver is configured to notify at least one of the first and second mobile devices that the first and second mobile devices are within the proximity and the first and second sets share at least one movie interest without revealing an identity of the first user or the second user.

11. The system of claim 10, further comprising a module to track locations of the first and second mobile devices.

12. The system of claim 11, wherein the location of the first mobile device is only provided if a sharing option is activated on the first mobile device.

13. The system of claim 10, wherein the first set of movie interests comprises at least one of movie interests input by the first user and movie interests derived from the first user's history of viewed movies.

* * * * *